United States Patent [19]

Alsina

[11] 4,335,519

[45] Jun. 22, 1982

[54] MIRROR MOUNT FOR AUTOMOTIVE ALIGNMENT APPARATUS

[75] Inventor: Pierre A. Alsina, Rochester, N.Y.

[73] Assignee: SpinOptic, Inc., Hornell, N.Y.

[21] Appl. No.: 144,978

[22] Filed: Apr. 30, 1980

[51] Int. Cl.³ .......................................... G01B 11/275
[52] U.S. Cl. ................................... 33/288; 33/203.18;
    33/336; 248/481; 356/155
[58] Field of Search ................ 33/203.18, 203, 203.19,
    33/288, 336; 356/155; 350/307, 288; 248/481,
    201, 225.3

[56] References Cited

U.S. PATENT DOCUMENTS

| 3,501,240 | 3/1970 | Haynes | 33/288 X |
| 3,552,700 | 1/1971 | Mitchell | 33/203.18 X |
| 4,011,659 | 3/1977 | Horvallius | 33/203 |
| 4,185,917 | 1/1980 | Alsina | 33/336 |

Primary Examiner—William D. Martin, Jr.

Attorney, Agent, or Firm—Shlesinger, Fitzsimmons & Shlesinger

[57] ABSTRACT

This mechanism includes a housing having three, equi-angular spaced, radially projecting arms which carry pivotal hook members that are releasably engagable with the rim of a wheel to secure the housing on the wheel for rotation therewith. Each hook member is adjustable longitudinally of its associated arm so that the mechanism can be mounted on wheels of various diameters. A circular casing, which is mounted on the housing normally to rotate therewith, carries an adjustable mirror having on its rear face a triangular plate held resiliently against a plane surface on said casing. A plurality of adjusting screws on the casing are engagable with the mirror to tilt it selectively about any one of the three edges of the triangular plate to position the mirror's reflecting surface in a plane normal to the axis of the rotation of the wheel. The casing can be rotated manually relative to the housing to adjust the tilting edges of the plate.

13 Claims, 3 Drawing Figures

MIRROR MOUNT FOR AUTOMOTIVE ALIGNMENT APPARATUS

This invention relates to front wheel alignment apparatus for automotive vehicles and the like, and more particularly to an improved device for mounting a mirror or like reflective surface on the front wheel of a vehicle for use in measuring front wheel camber, toe, etc.

Applicant's U.S. Pat. No. 4,185,917, which was granted Jan. 29, 1980, discloses a mechanism for adjustably mounting a reflective member, such as a mirror, on the front wheel of an automotive vehicle for use in checking front wheel alignment. The mirror is adjustably mounted on a frame which is releasably attachable to a tire rim by means of three clamps, which are adjustably mounted on three, rigid arms that project radially from the center of the frame. The patented mechanism includes means for adjusting the mirror universally about a stationary point relative to the frame, the ultimate purpose being to position the reflective surface of the mirror in a plane which is disposed at right angles to the axial center line of the associated wheel spindle.

Although the above-described mechanism has been found to be suitable for its intended purpose, it is an object of this invention to provide an improved mirror mounting mechanism of the type described, which can be mounted on the rim of a wheel with greater ease and accuracy as compared to prior such mechanisms.

To this end, it is a further object of this invention to provide improved means for releasably mounting mechanisms of the type described on the front wheels of automotive vehicles.

Still another object of this invention is to provide for a mechanism of the type described, improved means for adjustably supporting the mirror on the frame of the mechanism, thereby providing simpler means for accurately and rapidly placing the reflective surface of the mirror normal to the spindle axle of the associated wheel, after the frame has been mounted on the rim of the wheel.

It is an object of this invention also to provide an improved mechanism of the type described which is easier to use and more inexpensive to manufacture than prior such mechanisms.

Other objects of the invention will be apparent hereinafter from the specification and from the recital of the appended claims, particularly when read in conjunction with the accompanying drawings.

Figure 1:
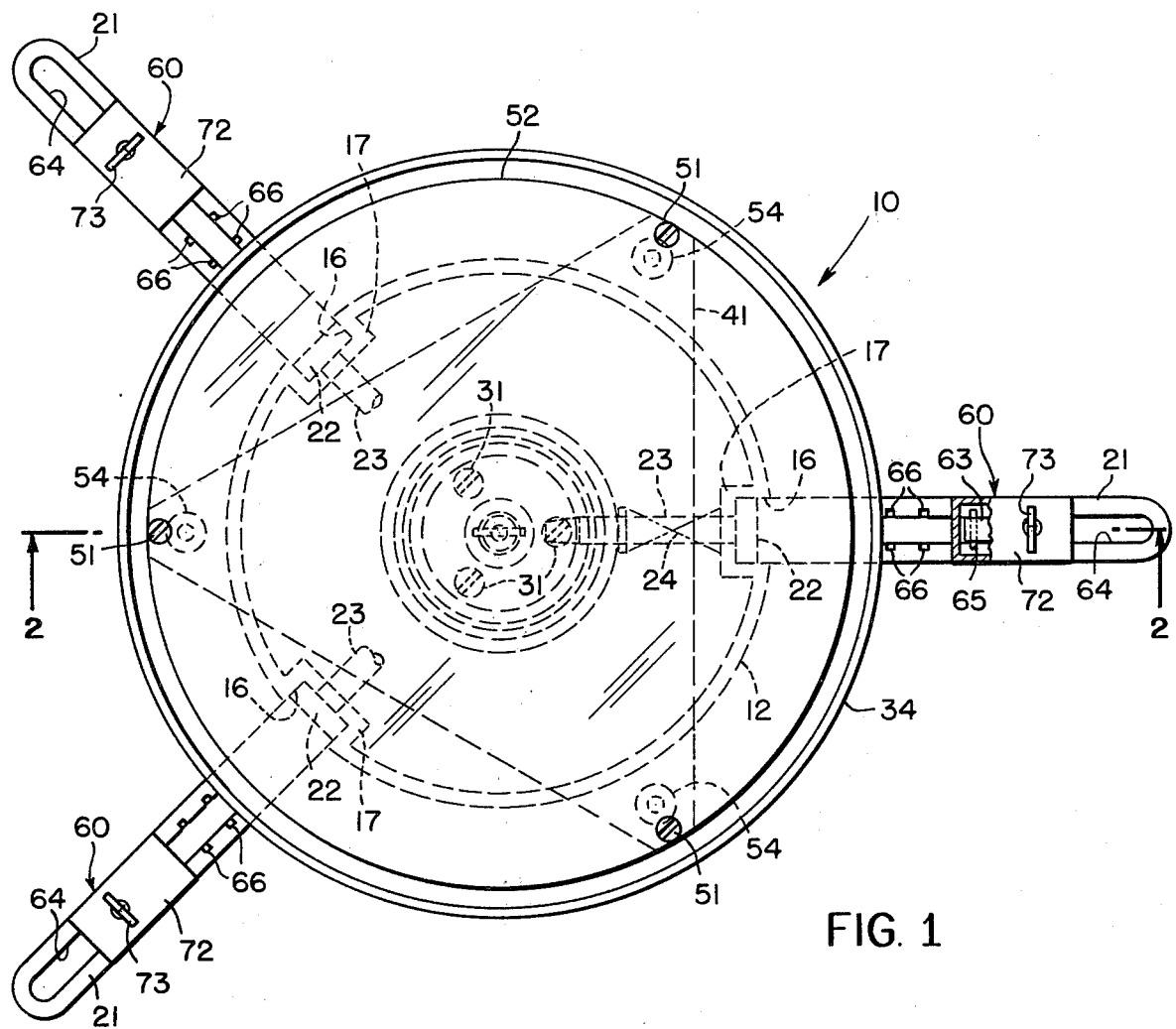
FIG. 1 is a front elevational view of a mirror mounting mechanism made according to one embodiment of this invention, portion of the hidden sections of the frame mounting arms being illustrated fragmentarily.
Figure 2:
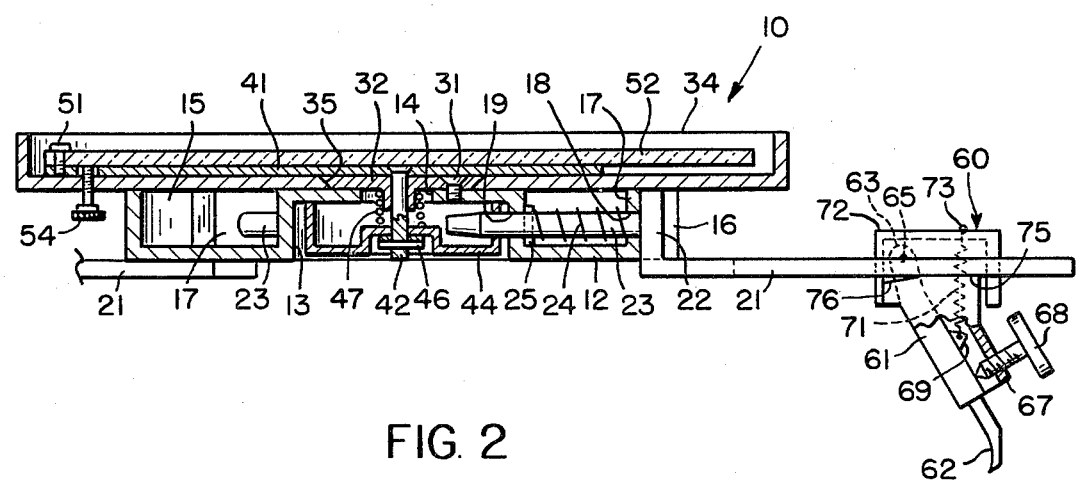
FIG. 2 is a fragmentary sectional view taken along the line 2—2 in FIG. 1 looking in the direction of the arrows, with portions thereof shown in full.

Referring now to the drawings by numerals of reference, 10 (FIGS. 1 and 2) denotes generally an improved mirror mounting mechanism comprising a circular, generally disc-shaped housing 12 having in one end (the right end as shown in FIG. 2) a cylindrical recess 13, and in its opposite end an axial bore 14 which communicates with recess 13 coaxially thereof. In its end opposite recess 13 of the housing 12 also has therein a generally annular recess 15 which is disposed coaxially about recess 13 and the bore 14. In its outer peripheral surface the housing 12 has formed therein three equi-angularly spaced notches or recesses 16, which are generally rectangular in configuration. The bottom 17 of each recess 16 has therethrough an opening 18 which registers with a similar opening 19 formed in the annular wall portion of housing 12 which separates recesses 13 and 15.

Projecting radially from the outer peripheral surface of housing 12 at equally angularly spaced points about its axis are three, identical, clamp-mounting arms 21. Each arm 21 has at its inner end a lateral foot section 22, which is seated slidably in one of the notches 16 in the periphery of housing 12. Each arm 21 is guided for limited sliding movement radially of housing 12 by means of cylindrical mounting stud 23, which projects from the bottom of each foot section 22 and slidably through a pair of the registering openings 18 and 19 in the housing. Intermediate its ends each stud 23 is surrounded by a coiled spring 24, which is disposed in the housing recess 15 for engagement at one end with the housing, and at the opposite end with a stop pin 25 which projects diametrally through each stud adjacent its inner end. Opposite ends of each pin 25 seat against the annular wall portion of housing 12 which separates recesses 13 and 15, whereby the springs 24 resist movement of the arms 21 radially outwardly from housing 12 for a purpose noted hereinafter.

Secured by screws 31 against the face of housing 12 at one end thereof (the left end as shown in FIG. 2) is a stationary mounting plate or disc 32. Surrounding disc 32 and held thereby rotatably against the face of housing 12 is a shallow, generally cup-shaped casing 34. As shown more clearly in FIGS. 2 and 3, the outer periphery of plate 32 is generally truncated-conical in configuration, and is seated coaxially in a complimentary shaped opening 35 that is formed in the closed end of casing 34. Plate 32 thus secures the casing against axial movement relative to housing 12, but because of the sliding engagement between its periphery and the inclined bore wall of the opening 35 in casing 34, it permits the casing to be rotated coaxially about plate 32 relative to housing 12.

Figure 3:
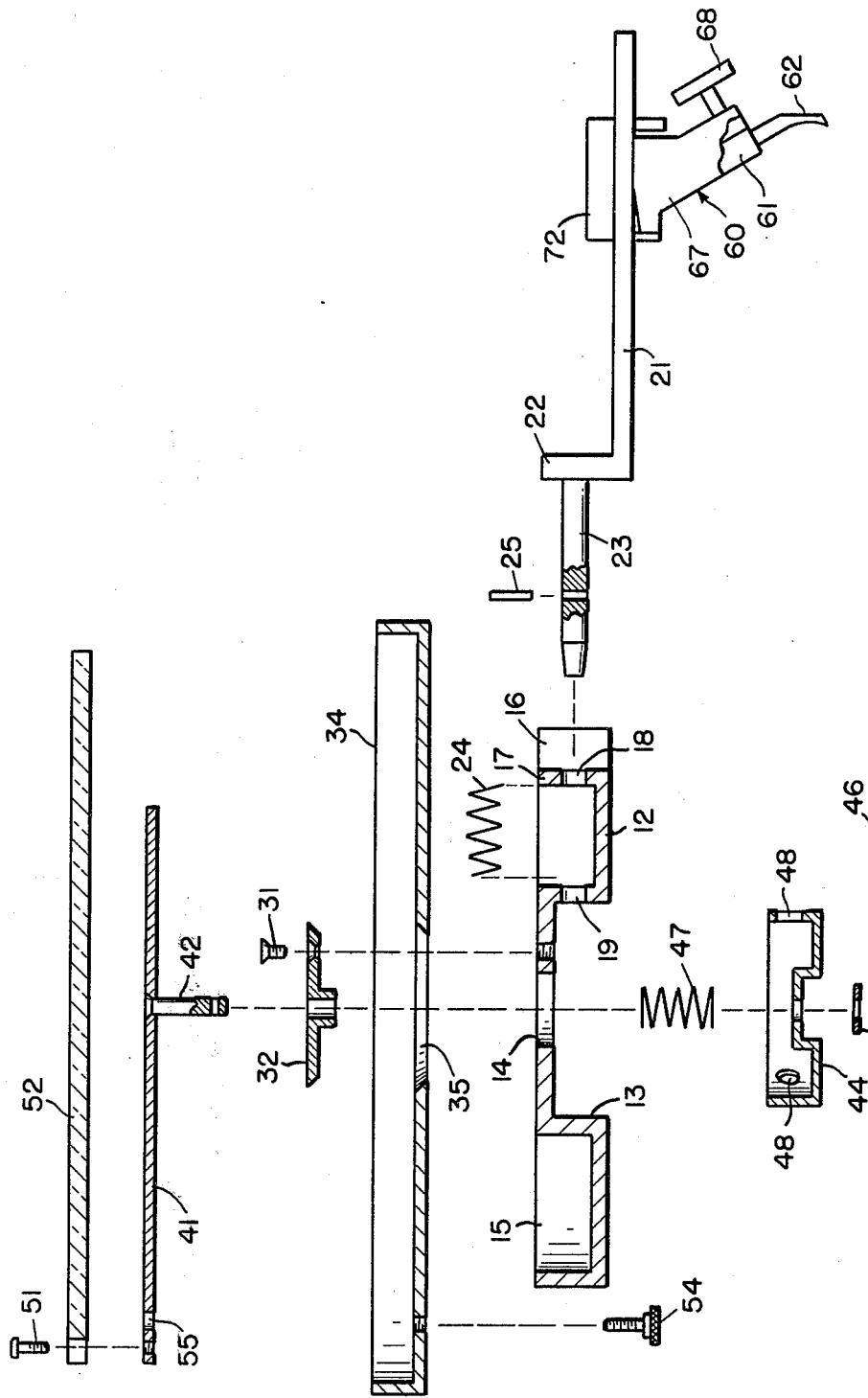
FIG. 3 is an exploded view of this mechanism showing certain of its parts in section, and other parts in full, and illustrating schematically the manner in which these various parts are adapted to be assembled.

Mounted for limited pivotal adjustment against the bottom of casing 34 is a triangularly-shaped pivot plate 41. Secured at one end of the plate 41 centrally thereof, and projecting slidably through an anxial bore in the stationary plate 32, and into the recess 13 in housing 12, is a rigid shaft 42. In recess 13 shaft 42 extends through a central opening formed in a generally cup-shaped spring retainer 44, which is positioned coaxially in recess 13, and which is held against axial movement off of the end of shaft 42 by a washer 45 and pin 46 that extends diametrally through the shaft 42 adjacent its free end. A coiled spring 47, which surrounds the shaft 42 in recess 13, is engaged at one end against the retainer 44 and at its opposite end against the underside of plate 32, whereby the spring 47 tends to retain the triangular plate 41 resiliently in coplanar engagment with the bottom of casing 34. Also, as shown in FIGS. 2 and 3, the inner ends of the studs 23 on arms 21 project slidably through registering openings 48 that are formed in the annular wall of the retainer 44, so that the retainer does not interfere with the radial movement of arms 21.

Secured by a plurality of screws 51 (three in the embodiment illustrated) to the surface of plate 41 is a plane, disc-shaped mirror 52. As shown more clearly in FIG. 1, the screws 51 thread into the plate 41 adjacent its respective corners or apices, and in such manner that the mirror 52 is secured against both axial and rotational movement relative to plate 41. Each of three adjusting screws 54 is adjustably threaded into the bottom of casing 54 in such manner that its threaded shank extends slidably through a registering opening 55 in the plate 41, and into engagement with the bottom of the mirror 52 adjacent one of the screws 51. As shown more clearly in FIG. 1, the three screws 54 are equiangularly spaced about the axis of housing 12 in a manner identical to that of the mirror mounting screws 51, so that their shanks can engage mirror 52 at points spaced slightly radially inwardly from the locations of the mounting screws 51.

Adjustably mounted on each of the arms 21 is a clamping device 60. Each of these devices, which are similar in configuration, comprises a tubular housing 61 having a rigid hook-shaped clamp 62 projecting from one end thereof. A lug 63, which is formed on the opposite end of each housing 61, projects through an elongate slot 64 in the associated arm 21, and is mounted to pivot about a pin 65, opposite ends of which are releasably seated in one of a plurality of pairs of registering notches or recesses 66 (FIG. 1) that are formed in one surface in each arm 21 adjacent opposite sides of its slot 64. Each housing 61 is pivotal about its pin 65 between the spaced, parallel legs of a inverted, generally U-shaped bracket 67 (FIGS. 2 and 3), which is mounted to pivot against the side of the associated arm 21 opposite to that containing the pivot pin supporting notches 66. An adjusting screw 68, which is threaded into the outer end of bracket 67, is engageable with housing 61 adjacent its outer end. Intermediate its ends each housing 61 has on its inner surface a lug 69 which is connected to one end of a spring 71. Each spring 71 extends at its opposite end through an opening in an inverted, generally rectangular housing or cover 72, which is mounted for sliding adjustment on the notched surface of each arm 21, and is secured to a pin 73 (FIG. 1), which overlies the outer surface of the associated cover 72.

Each spring 71 tends to hold the associated bracket 67 and its pivotal clamp housing 61 in a position shown, for example, in FIGS. 1 and 2, wherein the pivot pin 65 of each clamp housing 61 is releasably seated in a pair of notches 66 in an arm 21. At this time also, a plane surface 75 (FIG. 2) on each bracket 67 is seated in coplanar relation against one side of the associated arm 21. In these positions each spring 71 tends to hold the associated pivot pin 65 seated in a pair of the recesses 66. An entire clamping device 60, however, can be adjusted longitudinally on its associated arm 21 merely by pivoting the associated bracket 67 slightly clockwise from its position as shown in FIG. 2, thereby causing an adjacent, inclined surface 76 on the bracket 67 to be tilted into engagement with the associated arm 21. This causes the pivot pin 65 of the associated clamp housing 61 to be swung upwardly out of the notches 66 in which it had been seated, and thus releases the entire clamping device for radial movement along the associated arm 21 to a new position in which its pin 65 will register with, and can be seated in, a different pair of notches 66.

These radial adjustments of the clamping devices 60 permit the mechanism to be used on wheels of different sizes.

When the three devices 60 have been adjusted to the positions in which their hooks 62 will be engageable with the rim of the tire or wheel which is to be checked, the associated adjusting screws 68 can then be adjusted to cause the housings 61 to be pivoted slightly about their associated pins in a clamping direction (clockwise in FIG. 2) in order to engage the hooks 62 with the rim of each wheel. When this has been done, the mirror housing 12 will be mounted on the wheel generally centrally thereof, and will have its mirror section 52 facing away from the wheel and in position to have a laser beam directed thereon in a manner that will be apparent, for example, for the disclosure in applicant's above-noted U.S. Pat. No. 4,185,917. At this time the springs 24 cause the three arms 21 to be urged radially inwardly of housing 12, thereby maintaining the hooks 62 of the clamping devices 60 in resilient engagement with the peripheral surface of the wheel rim upon which the unit is mounted. The clamping devices 60 also support the housing 12 in slightly spaced relation to the face of the wheel upon which the unit is mounted, so that the operator will have ready access to the adjusting screws 54, which are used as noted hereinafter to adjust the mirror 52 on the housing 12 into a position in which its reflecting surface is disposed in a plane extending at right angles to the spindle axis, or an axis of rotation of the wheel that is to be balanced.

Assuming that a mechanism 10 has been clamped to a wheel in the manner noted above, and before adjusting the mirror 52 on its associated housing 12, it is necessary first to back off the adjusting screws 54 to make sure that they do not contact the rear surface of the mirror. This permits the mirror back-up plate 41 to be drawn into coplanar engagement with the bottom of the associated casing 34, thereby providing a starting position from which the mirror 52 can therefore be adjusted, if necessary.

Also at this time a beam of light from the associated alignment apparatus is directed onto the face of the mirror 52 for reflection thereby back onto the face of an alignment chart of the type shown, for example, in applicant's U.S. Pat. No. 4,185,917, or in U.S. Pat. No. 3,758,213, which is owned by the same assignee as the instant invention. Such charts are designed to denote the amount of toe, camber, etc. for the associated wheel. However, before such measurements can be made it is necessary first to make sure that the mirror 52 is properly located in a plane that extends at right angles to the axis of rotation of the wheel upon which it is mounted. As noted in applicant's abovenoted U.S. Pat. No. 4,185,917, if the mirror (mirror 52 in the present case) is not properly positioned, the beam of light which it projects onto the associated alignment chart (not illustrated) will rotate in a circular or oval path when the associated wheel is rotated. However, when the mirror is properly positioned, this reflected beam of light will form a stationary dot or spot on the alignment chart rather than a dot which revolves in a circular or oval path on the chart.

In the present case, assuming that the mirror 52 is not properly mounted, and therefore projects a reflected beam of light which forms a dot that revolves in a circular or nearly circular path on the associated alignment chart, the adjustment proceeds by rotating the wheel until the reflected dot (beam) is located at its uppermost or twelve o'clock position relative to its circular path of revolution on the face of the chart. The object now is to move the stationary dot, by adjustment of the mirror 52, vertically downwardly on the face of the chart toward the center of the circular or oval path in which it travels as the wheel is rotated. This adjustment is effected first by holding stationary the wheel upon which the mechanism 10 is mounted, and then manually rotating the casing 34 relative to the housing 12 until one of the screws 51 (and hence one of the points of the triangular plate 41) is positioned in its uppermost position relative to the axis of the mirror as shown in FIG. 1, or in other words at a twelve o'clock position relative to this axis. This has the effect of swinging one of the straight edges of the plate 41 into a horizontal position, which would be 180° from the horizontally disposed edge of plate 41 as illustrated by broken lines in FIG. 1.

At this stage both the reflected beam of light and one of the screws 51 will be in their uppermost positions relative to the axes about which they rotate. Now by adjusting the uppermost screw 54, which at this point will be positioned just behind the uppermost screw 51, the plate 41 and hence the mirror 52, will be pivoted about the horizontally disposed edge of plate 41, so that the reflected dot of light will be correspondingly shifted vertically downwardly toward the axis of the circular path in which it normally travels when the wheel is rotated. During this adjustment the associated wheel can also be oscillated slightly back and forth about its axis in order to monitor the relative position of the reflected light beam. If the adjustment is being made in the correct direction, the arcuate paths as described by the reflected beam during the oscillation of the wheel will grow smaller and smaller as the reflected beam approaches a point coincidental with the axis of rotation of the wheel. If and when the reflected dot becomes motionless during the oscillation of the wheel, the mirror should be properly positioned; and this can be determined by once again revolving the wheel fully about its axis. If the reflected beam of light remains as a stationary dot on the face of the chart, the mirror 52 is obviously in the desired plane, which is normal to the axis of rotation of the wheel.

While the above-described adjustments have been made in connection with the positioning of the reflected spot at the top of the path which is formed on the associated chart during the rotation of a wheel, it will be apparent that the reflected spot could also, if desired, be positioned at the bottom of such a circular path, after which the wheel can be held stationary and the casing 10 can be rotated until one of the screws 51 is likewise rotated to its lowermost point about the axis of mirror 52, as shown for example in FIG. 1. In this particular case the uppermost edge of the backup plate 41 will be disposed horizontally, as indicated by broken lines in FIG. 1. Then, by adjusting the screw 54 which is positioned rearwardly of the lowermost screw 51 as shown in FIG. 1, the plate 41 will be pivoted about its horizontal upper edge, and will cause the mirror 52 also to be pivoted about the edge, which movement will cause the reflected beam of light to be adjusted vertically upwardly and radially of the path normally followed by the reflected beam when the associated wheel is rotated.

In practice, either of the above adjustments should be sufficient to adjust the mirror rapidly into its desired plane normal to the axis to the rotation of the wheel. However, if necessary, it is equally apparent that slight lateral adjustments of the beam of light can be made by adjusting one or the other of the two remaining adjusting screws 54. However, by placing one of the straight edges of the mirror 41 in a horizontal position before making any adjustment, the need for any lateral or other adjustment of the mirror 52 should be minimized, if not completely eliminated.

After the mirror 52 has been located in the desired plane, the toe, caster and camber readings, etc. can be made in the usual manner, as will be readily apparent to one skilled in the art by reference, for example, to one of the above-noted U.S. patents.

From the foregoing, it will be apparent that the present invention provides a relatively simple, accurate and inexpensive means for releasably mounting a mirror on a wheel for use in connection with automotive alignment apparatus of the type described. The three adjustable clamping devices 60 are mounted for both coarse adjustment along each of the arms 21, as well as for fine adjustment as permitted by the associated adjusting screws 68. Moreover, by mounting each arm 21 resiliently for limited radial movement relative to the housing 12, it is possible to mount the associated mirror mechanism on almost any type of automotive wheel, regardless of its rim configuration.

Still another advantage of this invention is that it obviates the need for employing a spherical or knuckle-shaped mounting element for providing universal adjustment of the associated mirror element 52. By their very natures, such prior art devices are not easily adjusted, particularly as compared to applicant's novel device as shown herein, wherein pivotal adjustments of mirror 52 are limited, in essence, to pivotal movements about any one of three different lines or linear fulcrums, each of which is represented by one of the three, coplanar, intersecting edges of the triangular backing plate 41. While actual adjustments are made about any one or more of these three edges, the edges are in turn rotatable about the axis of casing 34, thereby, in effect, providing universal adjustment of the mirror relative to the casing. Finally adjustment of mirror 52 into its desired operating plane can therefore be made extremely rapidly and accurately as compared to prior such mounting devices.

Moreover, while this invention has been illustrated and described in detail in connection with only one embodiment thereof, it will be apparent that this invention is capable of still further modification, and that this application is intended to cover any such modifications as may fall within the scope of one skilled in the art, or the appended claims.

What I claim is:

1. A mechanism for releasably mounting a reflective surface on the wheel of an automotive vehicle or the like, comprising a housing having therein a central opening, and having thereon a plane surface extending transverse to the axis of said opening, a plurality of rigid arms projecting from said housing radially of said axis, an adjustable clamping device mounted on each of said arms and releasably engagable with the rim of a wheel on a vehicle for supporting said housing on said wheel for rotation therewith, a reflecting member adjustably mounted on said housing and having thereon a plane reflective surface facing away from said housing, resilient means interposed between said member and said housing and resiliently urging said member into a first position in which said reflective surface thereof is disposed parallel to said plane surface on said housing, means defining a plurality of linear fulcrums located in a common plane between said member and said housing, and means for tilting said member selectively about any of said fulcrums to swing said member from said first position to a second position in which said reflective surface is inclined to said plane surface on said housing.

2. A mechanism as defined in claim 1, including
means mounting said linear fulcrums and said tilting means for rotation about said axis of the housing,
said mounting means including means frictionally resisting rotation of said fulcrums and said tilting means about said axis.

3. A mechanism as defined in claim 2, including
means mounting each of said arms on said housing for limited movement radially of said axis, and
further resilient means interposed between said housing and said arms and operatively resisting radial movement of said arms relative to said housing.

4. A mechanism as defined in claim 1, wherein each of said clamping devices comprises
a pivot pin mounted on each of said arms for adjustment longitudinally thereof and selectively into one of a plurality of different operating positions depending upon the size of the wheel on which the mechanism is to be mounted,
a clamp pivotally connected at one end to said pin and having a hook on its opposite end for engagement with the rim of a wheel,
an adjusting rocker interposed between said clamp and the arm upon which said clamp is mounted, and
a spring urging said clamp and said rocker into first positions in which said pivot pin for said clamp is held in one of its operating positions,
said rocker being tiltable manually relative to its associated arm from its first position to a second position in which said pin is released from said one operating position thereof for sliding adjustment along the associated arm to a second operating position thereon.

5. A mechanism as defined in claim 4, including an adjusting screw mounted in said rocker and engaged with said clamp adjacent the hooked end thereof, said screw being rotatable selectively in opposite directions to effect pivotal movement of said clamp relative to said rocker and said arm.

6. A mechamism, as defined in claim 1, wherein
said means defining said fulcrums comprises a plate secured to the back of said reflecting member and having a plurality of linear edge each of which defines one of said linear fulcrums,
said tilting means comprises a plurality of adjusting screws mounted on said housing and having the ends thereof engaged with the side of said member opposite its relative surface, and
each of said screws is rotatable manually to urge said reflecting member pivotally about one of said linear edges of said plate.

7. A mechanism as defined in claim 6, including means mounting said member and said plate for rotational adjustment about the axis of said opening in said housing, whereby substantially universal adjustment of said reflective surface about said axis is possible.

8. A mechanism as defined in claim 7, wherein the last-named means comprises
a casing having a plane, closed end disposed in coplanar, frictional engagement with said plane surface on said housing, said casing being rotatable manually relative to said housing about the axis of said central opening, and against the resistance caused by said frictional engagement, and
means mounting said reflecting member and said plate in a central opening in said casing for rotation with the latter and for limited tilting movement relative to said casing about the edges of said plate.

9. A mechanism for removably mounting a reflective surface on the wheel of an automotive vehicle, comprising
a casing having thereon a plane surface,
means for releasably mounting said casing on the wheel of a vehicle for rotation therewith, and for rotational adjustment relative to said wheel about an axis that extends normal to said plane surface on said casing,
a reflecting member having a plane reflective surface on one side thereof,
means adjustably supporting said member on said casing with said reflective surface facing away from said casing, and for adjustment into and out of a starting position in which said reflective surface is parallel to said plane surface on said casing,
said supporting means including means defining a plurality of fulcrums which lie in a common plane extending normal to said axis between said member and said casing, and
manually operable means for selectively tilting said member about any of said fulcrums relative to said casing.

10. A mechanism as defined in claim 9, wherein
said means defining said fulcrums comprises a plate secured to said member at the side thereof opposite said reflective surface, and having formed on its periphery a plurality of straight edges at least certain of which extend transversely of each other, and
said plate is mounted for limited tilting movement selectively about said edges into and out of said starting position.

11. A mechanism as defined in claim 10, wherein said plate is generally triangular in configuration.

12. A mechanism as defined in claim 11, wherein said manually operable means comprises three screws adjustably threaded in said casing and engageable with said member adjacent the three corners, respectively, of said plate.

13. A mechanism as defined in claim 9, wherein said mounting means includes
a housing having adjacent one end a plurality of clamps for releasably securing the housing to a wheel so that a plane surface on the opposite end of the housing faces away from the wheel, and
means for rotatably mounting said casing on said housing with the plane surface on said casing disposed in coplanar, frictional engagement with said plane surface on said housing.

* * * * *